United States Patent

Traube

[15] 3,670,867

[45] June 20, 1972

[54] CONVEYOR SYSTEM
[72] Inventor: Robert J. Traube, San Mateo, Calif.
[73] Assignee: FMC Corporation, San Jose, Calif.
[22] Filed: Nov. 17, 1969
[21] Appl. No.: 871,298

Related U.S. Application Data
[62] Division of Ser. No. 754,443, Aug. 21, 1968.

[52] U.S. Cl. .................................. 198/38, 186/1.1, 198/75, 214/16 B
[51] Int. Cl. ...................................... B65g 47/00, E04h 3/04
[58] Field of Search ........................... 198/38, 75; 186/1, 1.1; 209/122, 125; 214/11, 16.4

[56]         References Cited

UNITED STATES PATENTS

3,532,184  10/1970  Blake ..........................................186/1

Primary Examiner—Edward A. Sroka
Attorney—F. W. Anderson and C. E. Tripp

[57]         ABSTRACT

A storage and retrieval system for goods has two power operated conveyors movable in separate endless loops past two (or more) spaced apart picking stations, each picking station common to both conveyors. Each conveyor has bins with compartments in which goods are stored. Although the bins on each conveyor remain in the same sequence, the bins are movable relative to each other on the conveyor to define "buffer" zones which permit simultaneous picking by two spaced apart pickers. The control system for the conveyors includes a reader which receives digital data concerning a group of orders to be picked from a stack of cards, each card giving the identity, quantity and distribution of one of the articles to be picked. The two conveyors are automatically stopped alternately with the bins containing ordered goods at the picking stations, and the operator at each picking station picks goods from the bins in accordance with a read-out unit which displays the card data. A plurality of packing lanes originate at each picking station and terminate at a plurality of packing stations. Each picker distributes goods to the separate packing lanes in accordance with the read-out unit at the picking station.

5 Claims, 18 Drawing Figures

INVENTOR.
ROBERT J. TRAUBE

BY F.W. Anderson
C.E. Tripp
ATTORNEYS

FIG_9

FIG_10

FIG_12

CONVEYOR SYSTEM

This is a division of application Ser. No. 754,443 filed Aug. 21, 1968.

BACKGROUND OF THE INVENTION

The present invention relates to a storage and retrieval system for goods stored in and taken from, for example, a warehouse.

In some warehouse systems, goods are stored in stationary bins, and orders are filled by pickers who travel throughout the warehouse filling individual orders. The articles are placed in a cart or other vehicle by the picker, and the picker pushes or rides the vehicle throughout the warehouse in filling the order. When the order is completed, the goods are taken to a packing station for shipment to the customer. Order filling by this method requires an excessive amount of travel by the picker and consumes a large amount of time for each order. The large number of papers or documents (one for each order) handled by the picker slows the order filling and leads to errors and lost orders.

Other warehouse systems, although more mechanized, are subject to some of the same disadvantages as the less mechanized systems. For example, in many systems the individual carts with which the orders are picked are replaced, or supplemented, by mechanized conveyors. In these systems, orders are picked from stationary or dead storage bins and are placed on the conveyor for transport to a sorting station. At the sorting station, a sorter places the goods for each customer in an individual container which, when all the goods for the order have been received, is sent to a packer for that particular order. Although orders can be filled more quickly by this system than with less mechanized systems, it is necessary for a picker, sorter, and packer to handle each order, and to handle the papers for that order, before the order is wrapped for shipment.

SUMMARY OF THE INVENTION

In the system of the present invention, only a picker and a packer handle each order, and neither need move about to collect the articles of the order. Moreover, both handle a plurality of orders simultaneously to substantially reduce the amount of time each spends on each order. A minimal amount of papers are handled in the system of the present invention while picking or packing the orders, and thus the order handling time and the delays caused by lost or misplaced order sheets are reduced. In the preferred form of the invention, two live storage conveyors each have a plurality of compartmental bins which are moved by the conveyors in endless paths. At least two alternate operational schemes can be utilized. In the first, the bins of one conveyor carry half the articles stored and the bins of the other conveyor carry the other half of the articles stored. In the second scheme, each conveyor contains sufficient bins to carry the total number of items stored.

A group of orders for articles to be shipped, for example, to a group of stores, is placed on cards, each card indicating the quantity of a single article which is to be shipped to each store in the group. Each card also indicates the total quantity of articles needed and the location of the stored articles on the conveyors. These cards may, for example, be produced by a computer which divides the large number of orders (say, 300) received each day into small groups of orders of, for example, six orders per group. The orders are grouped on a basis to suit the convenience of the user of the system. For example, the orders can be grouped in the required order of shipment, or according to the mode, or according to the vehicle of shipment. Thus, out of say 300 orders, 50 groups of orders are compiled by the computer. Two significant advantages, in addition to the convenience of handling the orders in the sequence of shipment or according to vehicle or mode of shipment, accrue from "batching" the orders. First, a larger quantity of each article is usually picked, increasing the efficiency of the picker. Secondly, and more important, a greater proportion of bins will supply items to a picker on a single revolution of the conveyor than if a single order were picked, thereby minimizing conveyor travel per article picked.

The order cards for a group of orders are placed in a card reader at the picking station where the information on each card is displayed, card by card, on a read-out unit at the station to inform the picker what articles are to be picked.

The conveyor bins, which can be disengaged from the conveyor drive mechanism, do not fill up the conveyor. Although the bins always remain in the same sequence around the endless loop of each conveyor, the bins of a single conveyor can be moved with respect to adjacent bins. When article card information is displayed on the read-out at each station, the bin containing that article is stopped by control mechanisms so as to permit the operator to pick the total quantity of that particular article needed to fill the six orders in the particular group of orders currently in the card reader. The drive mechanism, however, runs continuously, and although a bin of a conveyor is stopped at the picking station another bin of the conveyor may simultaneously be approaching the picking station.

Six packing conveyors, one for each store order in the group, originate at the picking station and terminate, respectively, at six packing stations. As the picker takes the articles from the conveyor bin, the articles are distributed, as indicated by the read-out unit, among the different packing conveyors which carry them to the respective packing stations. Alternatively, in lieu of the six conveyors, six tote-bins are provided to receive articles for the six orders of the group being picked. The articles are deposited in the tote-bins by the picker. At the conclusion of the complete picking cycle for the group of orders picked, the tote-bins are transported to the packing station on the packing conveyor.

After an article is picked and distributed among the small orders by a picker, he pushes a button which will erase from the read-out unit data from the card for that article and cause the data from the card for the next article to be displayed on the read-out unit. Actuation of the button also releases the storage bin containing the article just picked to clear the picking station for the storage bin containing the next article required from that conveyor. Preferably, the cards are arranged in sequence in the card reader so that every other card indicates an article in a bin on one conveyor and alternate cards indicate articles in bins on the other conveyor. Thus, while the operator is picking articles from bins on one conveyor, the other conveyor is bringing the bin containing the next required article to the picking station. Thus, during the time one bin is conveyed to the picking station, the picker is picking articles from a bin on the other conveyor. Each bin is coded and the code of passing bins is read at the picking station to halt the next required bin of a conveyor when that bin, which is recorded on the card in the card reader, reaches the picking station.

After each order is completed, a packer, who checks off the items as they reach the packing station, packs the order for shipment to the customer.

It is therefore one object of the present invention to provide a storage and retrieval system in which a picker can pick articles without transportation delay between articles. It is yet another object of the present invention to automatically control two conveyors with respect to a picking station.

BRIEF DESCRIPTION OF THE DRAWINGS

FIG. 18 is a schematic representation of a conveyor system with buffer zones as in the system of FIG. 1.

DESCRIPTION OF THE PREFERRED EMBODIMENT

Figure 1:
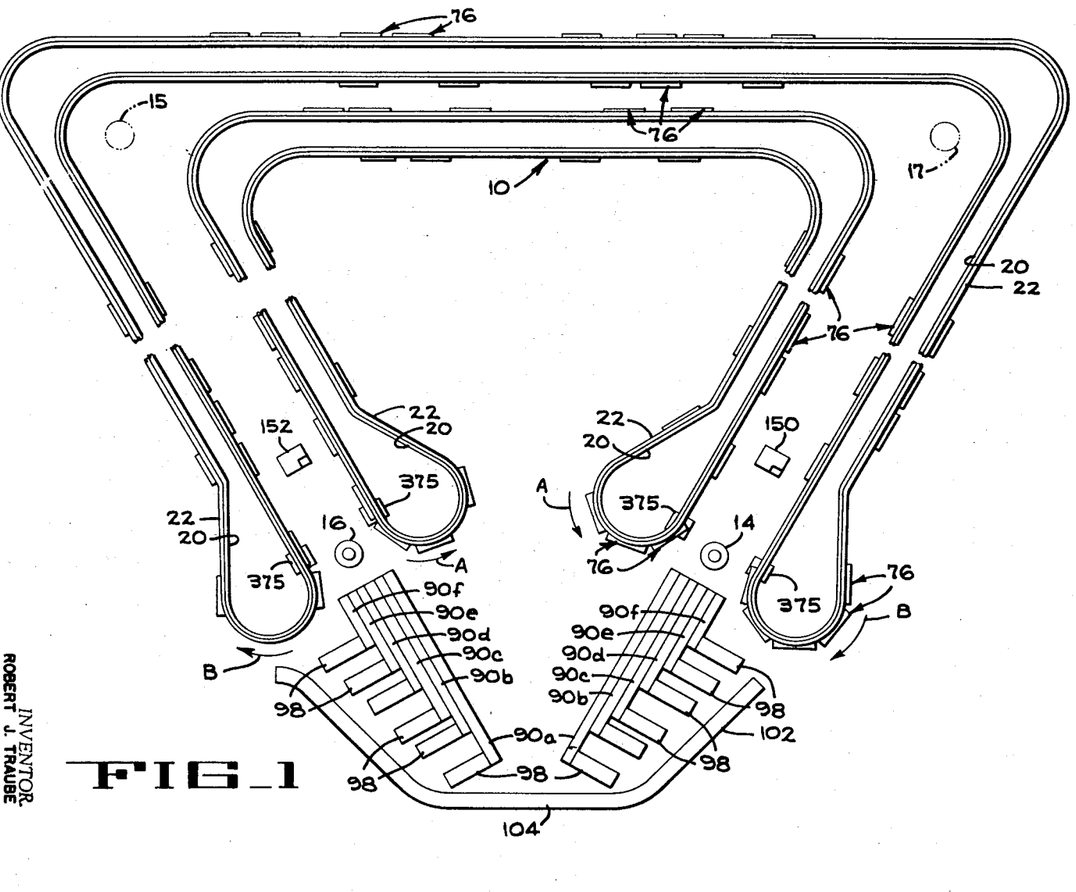
FIG. 1 is a plan view of the system of the present invention.

As shown in FIG. 1, the storage and retrieval system of the present invention has two live storage conveyors 10, 12, each defining an endless loop. The inner conveyor 10 moves in the direction indicated by arrows A and the outer conveyor 12 moves in the direction indicated by arrows B. Conveyor 10 lies in an endless path which passes along one side of a first picking station 14 and along one side of a second picking station 16. Conveyor 12 lies in an endless path which passes along the other side of picking station 14 and the other side of picking station 16. Picking station 14 is at one end of the loops (which are somewhat flattened and in a three sided array) defined by conveyors 10 and 12, and picking station 16 is at the opposite end of these loops. In other words, the distance along one side of each loop between the two picking stations is substantially equal to the distance along the other side of each loop between the two picking stations. It should be understood that, if desired, additional picking stations can be provided between the conveyors as indicated, for example, by dotted circles at 15 and 17. However, to simplify the disclosure, a system with the two picking stations 14 and 16 only will be described.

Figure 3:
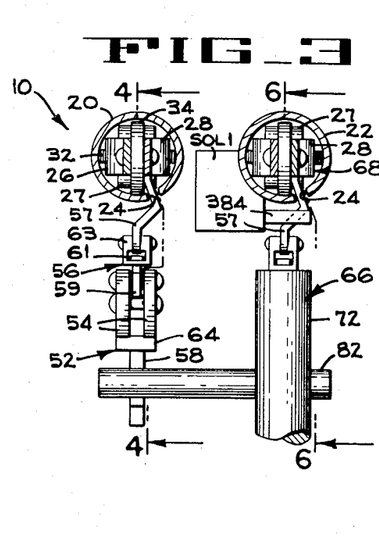
FIG. 3 is a view taken on the line 3—3 of FIG. 2.
Figure 4:
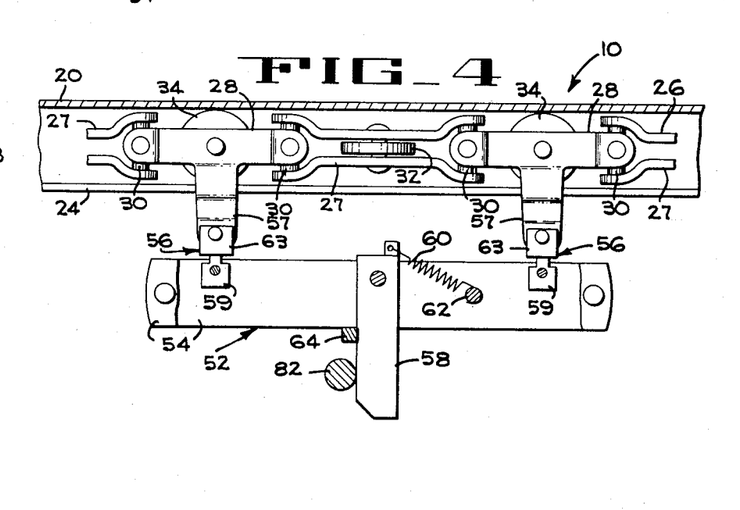
FIG. 4 is a view taken on the line 4—4 of FIG. 3.
Figure 5:
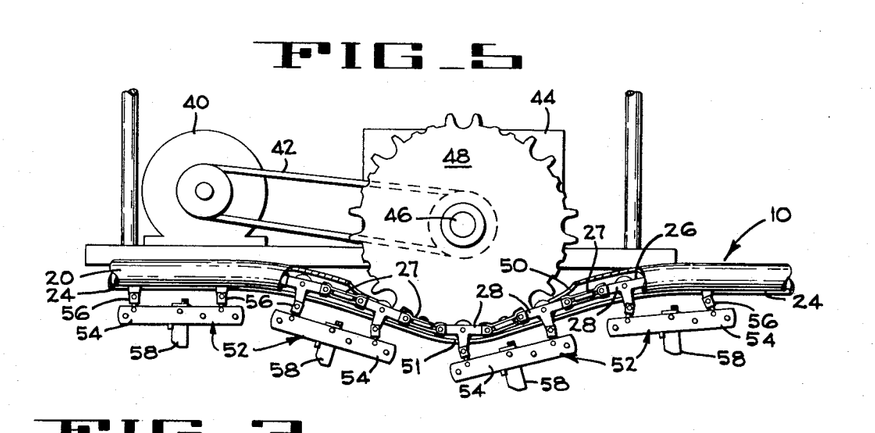
FIG. 5 is a view in elevation, with parts broken away, of a motor for energizing one of the conveyors.

As shown best in FIGS. 3, 4 and 5, each conveyor 10, 12 has two parallel tubular tracks 20, 22, each of which has a slit 24 along the lower edge. The inner track 20 of each conveyor loop receives a continuous endless chain 26, as shown best in FIG. 4, made up of links 27, 28 connected together by universal couplings 30. Every other link (links 27) has a horizontal guide roller 32 journaled therein and alternate links (links 28) have vertical support rollers 34 journaled therein to facilitate the movement of the chain through the tubular track. An electric motor 40 is mounted adjacent the track 20 of each conveyor loop. The motor 40 is connected by belt 42 to a gear reducer 44 which has an output shaft 46. A sprocket 48 mounted on the output shaft engages the chain 26 at an elongated opening 50 and dip 51 in the tubular track. The chain 26 is driven continuously during operation of the conveyor by motor 40.

A plurality of drive carriages 52 are connected to chain 26 at equally spaced intervals and are continuously driven thereby around the loop defined by the conveyor. Each carriage 52 has a pair of parallel spaced apart straps 54 which receive therebetween two connectors 56. Each pivotal connector has a base 59, pivotally secured between straps 54. The base 59 has a head 61 pivotally received in a U-shaped link 63 which is pivotally connected to arms 57. A driving dog 58 is pivotally received between straps 54 and a spring 60 is connected between the upper end of dog 58 and a lug 62 extending between straps 54. Spring 60 biases the driving dog clockwise (as viewed in FIG. 4) with the lower end of the dog against a stop 64 which is connected across the lower edges of straps 54.

Figures 1B, 2:
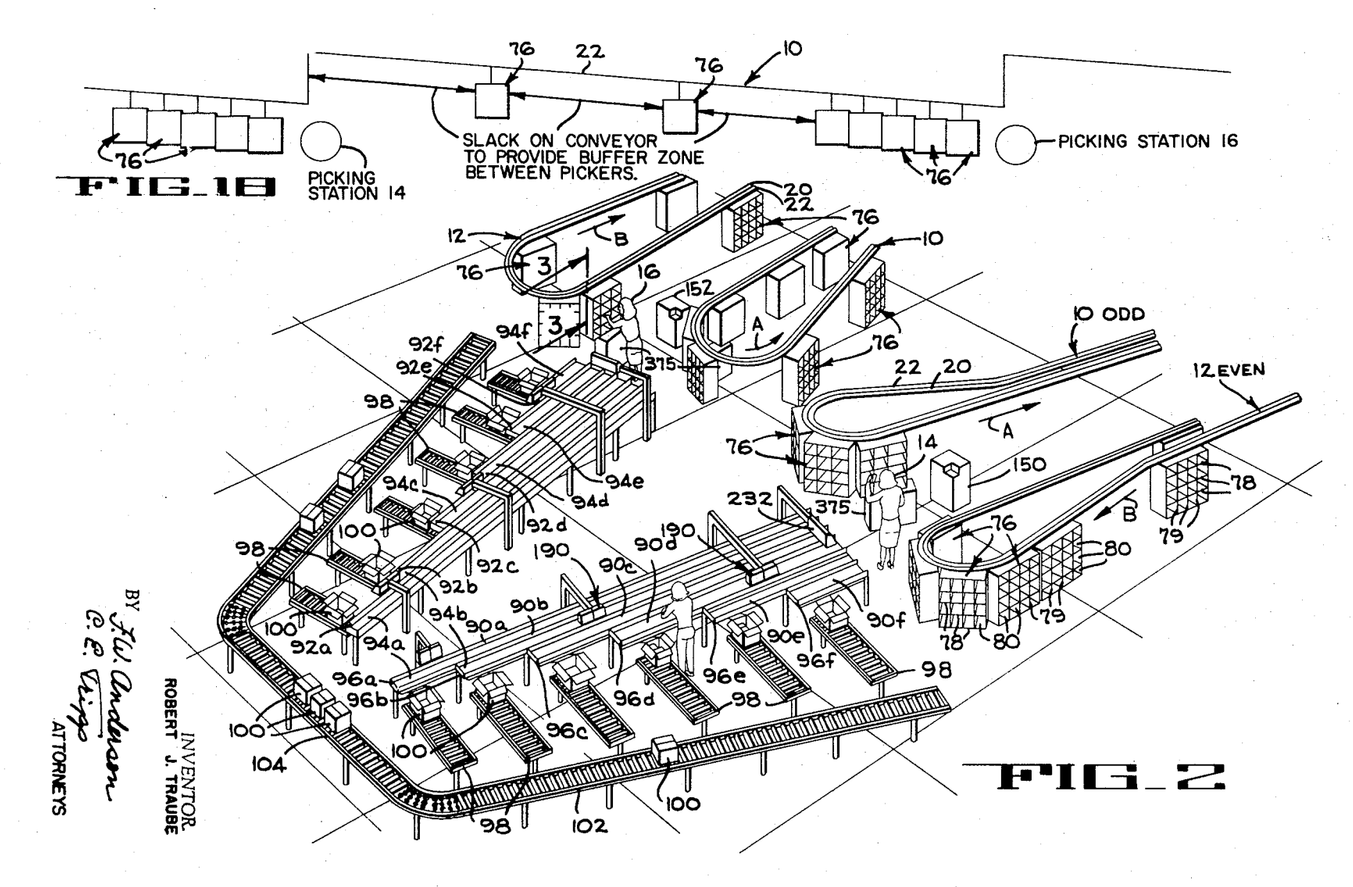
FIG. 2 is a view in perspective of a portion of the system of FIG. 1.
Figure 6:
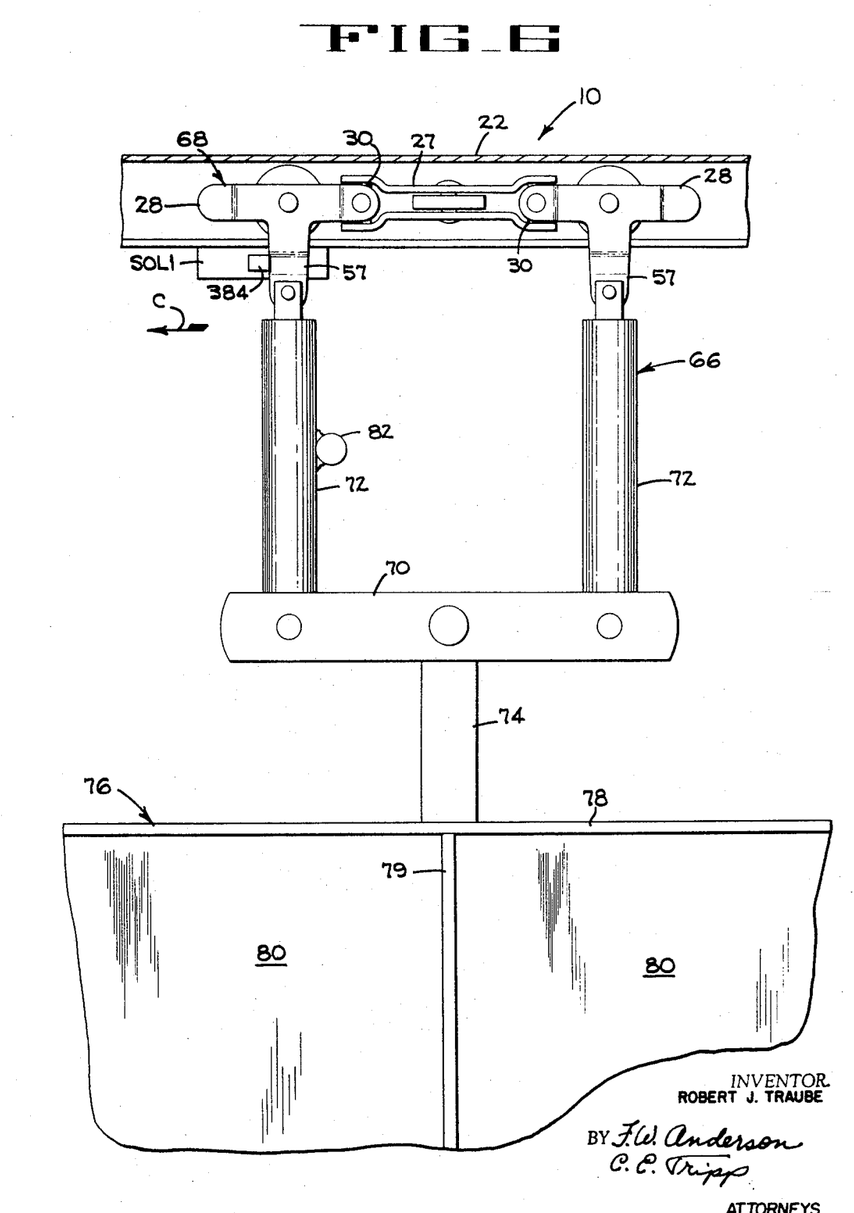
FIG. 6 is a view taken on the line 6—6 of FIG. 3.

As shown best in FIG. 6, a plurality of bin carriages 66 are suspended from the outer track 22 of each conveyor 10, 12. For each bin carriage, there is a group 68 of links received in tubular track 22. Each group 68 comprises three links (two end vertical links 28 and a central horizontal link 27), which, as in chain 26, are connected together by universal couplings 30. Each bin carriage has two parallel spaced apart straps 70 which receive therebetween two upstanding arms 72 pivotally connected at their upper ends to the depending arms 57 of end links 28 of link group 68. Pivotally suspended from the straps 70 is a bar 74 which is secured to the upper end of bins, or containers 76. Each bin 76 has horizontal shelves 78 (see FIG. 2) and vertical dividers 79 which divide the bin into compartments 80.

The forward arm 72 (relative to the direction of movement as indicated by arrow C) of bin carriage 66 has a laterally extending rod 82 secured thereto which extends inwardly into the path of the lower end of the yieldable drive dogs 58 on the drive carriages, as shown in FIG. 4. When the drive dog on a drive carriage engages rod 82 of the bin carriage, and the bin is unrestrained, the spring 60 will prevent the dog from yielding and the drive carriage will drive the bin along the conveyor loop until the bin is restrained. When the bin is restrained, the driving dog will yield and pass over rod 82, returning to its normal upright position after passing the rod. Subsequent drive dogs on the subsequent drive carriages, which continuously move around the conveyor loop, will also trip over the lateral rod 82 as long as the bin is restrained. When the bin is released from restraint, the drive dog on the next drive carriage will advance the released bin carriage. Thus, the conveyors 10 and 12 have bins 76 which move continuously toward the next picking station unless restrained. Since the bins do not occupy all the space on the conveyor, slack, or buffer zones are left between the pickers which permits relative movement between the bins. Such a system can be depicted schematically, as shown in FIG. 18, by a conveyor with steps at each picking station and a downward slope between picking stations. The bins move freely under the force of gravity until they are restrained. The total space on the conveyor unoccupied by bins between two picking stations defines a buffer zone between the two picking stations. This buffer zone, or slack, on the conveyor eliminates the need for precise coordination between the picking instructions at the two picking stations.

There are six packing conveyors 90a, 90b, 90c, 90d, 90e and 90f originating at each picking station 14, 16 and terminating respectively, at six packing stations 92a, 92b, 92c, 92d, 92e and 92f. Each packing conveyor has an endless driven belt 94a, 94b, 94c, 94d, 94e and 94f, respectively, which carries articles placed thereon at the picking station up to and against an end stop 96a, 96b, 96c, 96d, 96e and 96f, respectively, at each packing station. Each packing station has a short roller conveyor 98 to hold a container 100 which is being packed with articles transported to the packing station from the picking station. When an order received at a packing station is complete, container 100 is sealed and pushed to a gravity roller conveyor 102 which carries the sealed containers to a shipping station 104 where they are removed for shipment.

Assume, by way of example, that there are a total of 199 numbered conveyor bins 76, odd numbered bins consecutively arrayed on conveyor 10 and even numbered bins consecutively arrayed on conveyor 12. Each bin as an example may have 16 compartments in which articles are stored. By way of example, assume that the warehouse in which the system of the present invention is installed receives on the average of 300 orders a day from 300 different stores. Assume that each order calls for an average of 20 different articles in quantities ranging, in the typical case, from five to 25.

The efficiency of picking can be materially increased by increasing the quantity of articles picked from a bin compartment at any one time. To accomplish this, the orders for each day are not handled individually, but, instead, are divided into groups, each group containing, for example, six orders. The orders are grouped on any basis the user of the system may desire. As a consequence of the grouping, the total requirement on a single picking sequence is increased for many articles. Of greater consequence is the fact that a greater proportion of the total available articles will be required on a single picking sequence for a group of orders, and the necessary transport, or bin movement, time is prorated over a greater number of articles during a picking sequence.

Figure 7:
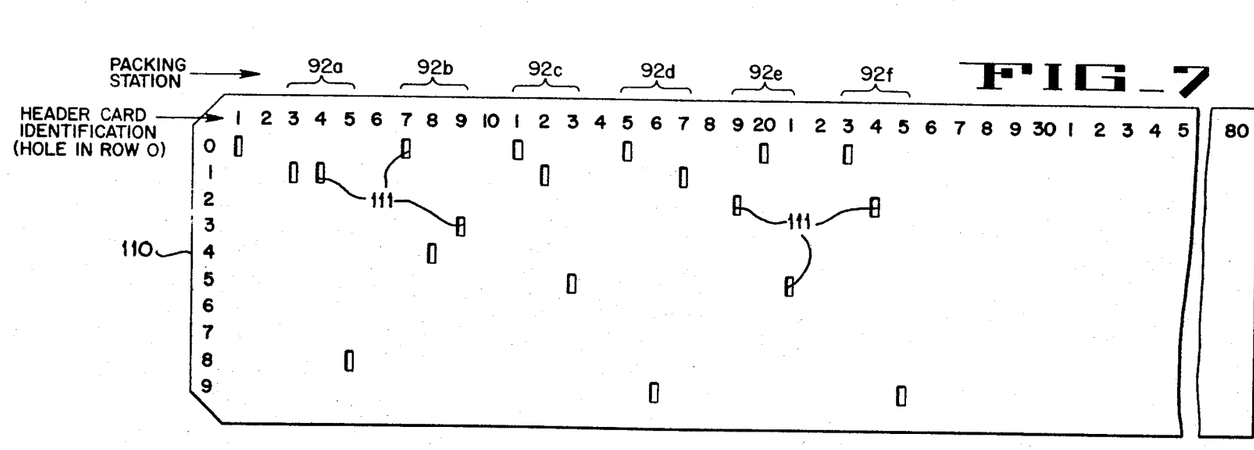
FIGS. 7 and 8 are views, respectively, of the header card and the article card utilized in the system of FIG. 1.

For each group of orders, a single header card 110 (FIG. 7) is prepared. Each card has rows and columns, and the order numbers (or, more specifically, the numbers assigned to the stores who have sent in the orders) are punched into the card, as indicated at 111. Three adjacent columns will represent the three digits of one store number, and the row in which a hole is punched will indicate the particular digit in each row corresponding to the digits in the store number. The six orders will be sent, respectively, to the six packing stations of one of the picking stations, as indicated in FIG. 7. The first column of each header card has a hole punched in row zero to indicate that the card is a header card.

For each article required in a group of orders, an article card 112 (FIG. 8) is prepared. Each article card, which has columns and rows like the header card, is coded by punched holes, as at 114, to indicate, for that article, the following data:
1. Bin number in which article stored,
2. Compartment number in bin in which article stored,
3. The total quantity of that article required for the six stores of the group,
4. The quantity of the article required for each store of the group,
5. Whether the bin is to be released after article picked (bin not released if next article in same bin),
6. The number of the bin from which the next article on the other conveyor must be picked (to stop the desired bin on the other conveyor if it reaches the picking station as current article being picked). If the next bin number is on the same conveyor, that bin number does not appear on the card since that bin cannot enter the picking station until after the current bin is released.

Figure 8:
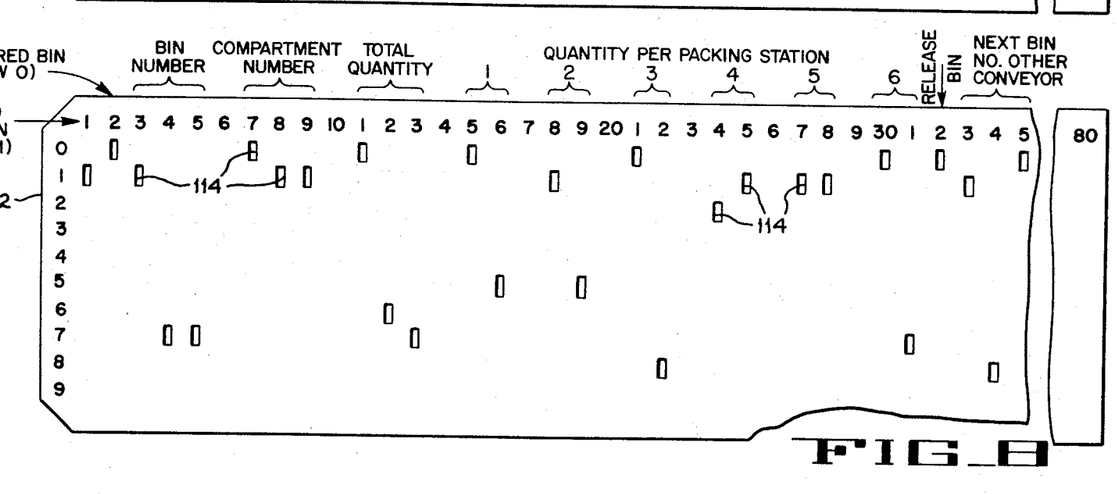

In addition, the article card 112 has a hole punched in row 1, column 1 to distinguish the article card from the header card which has a hole punched in row "0", column 1. The article card has a hole punched in row "0" of column 32 if the bin is to be released after the current article is picked therefrom. If the next article is located in the same bin, and the bin must therefore remain in the picking station, no hole is punched in the "0" row of column 32.

The cards for each group (one header card and a card for each article required in that group) are combined with the header card on top. In general, the article cards are arranged in numerical order of the bins on the conveyors. Each article card for another article in the same bin follows in numerical sequence of the compartment numbers. Preferably the article cards alternate between the odd and even conveyors. In other words, each article card for an article not in the same bin should be for a bin and article on the opposite conveyor from the conveyor on which the previous article was carried. In any event, the article cards for even numbered bins (which are in numerical order on conveyor 12) must be in numerical order and the article cards for odd numbered bins (which are in numerical order on conveyor 10) must be in numerical order. In the illustrative system disclosed, half the articles are stored in the even bins and the other half in the odd numbered bins. However, an even numbered card may be placed ahead of a slightly lower numbered odd card and an odd numbered card may be placed ahead of a slightly lower numbered even card to permit a sequence of alternate odd and even cards.

The cards for each group of orders are arranged in a sequence designed to permit substantially simultaneous picking of one group of orders at one picking station while another group of orders is being picked at the other picking station. As shown in FIG. 1, one picking station is on the opposite side of the loop from the other picking station. Thus, the group of cards for one picker is arranged so that the first articles picked are situated in bin number 1 while the group of cards for the other picker is arranged so that the first articles picked are situated in bin number 100, assuming a total of 199 bins. For each group of orders, both conveyors 10 and 12 will make a complete revolution during the picking cycle. Preferably, the orders are grouped, and the header and article cards are prepared, by a computer.

A stack of punched cards for one group of orders is placed in a card reader 150 in picking station 14 by the picker at that station. A stack of punched cards for another group of orders is placed in an identical card reader 152 in picking station 16 by the picker at that station. Since the control apparatus for controlling the conveyor in response to the coded card data supplied to the reader is the same for each picking station, only the control mechanism for picking station 14 (shown in FIGS. 9 to 15 inclusive) will be described.

The card reader 150 (see FIG. 9) senses the columns of each card received therein consecutively and impresses, for each column, a signal at one of the terminals 151 (one for each digit as indicated) corresponding to the digit row at which the column has a punched hole. This signal is transmitted by lines 154 and received at one of the ten inputs 156 of a binary coded decimal (BCD) conversion unit 158. The digital input, as, for example, the number 7, is instantly transmitted to binary output terminals 160 which are code equivalents of the four digits 8, 4, 2 and 1, as indicated. Thus, to represent a digit 7 at output terminals 160, a signal is required on the outputs, the code equivalent of which totals 7, or, the output terminals 4, 2 and 1.

Figure 9:
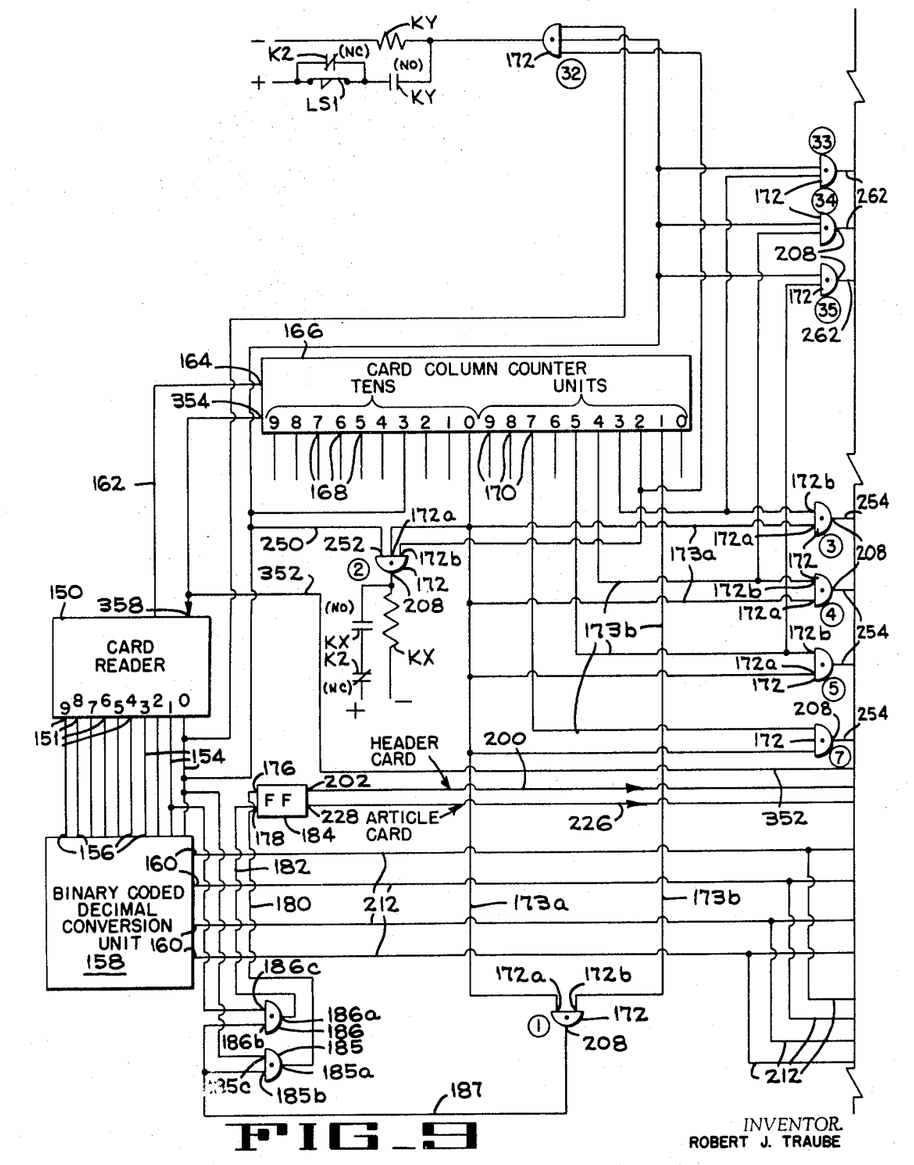
FIGS. 9, 10, 11, 12, 13 and 14 are schematic diagrams of the control apparatus of the system of FIG. 1.

Each time the card reader 150 steps from one column to the next, a pulse is transmitted by line 162 to input terminal 164 of counter 166. The counter, which has "ten" and "unit" output terminals 168, 170, respectively, produces simultaneously a signal on one terminal 168 and on one terminal 170 for each column of the card, thereby producing a unique signal for each column of the card corresponding to the particular column of the card being read at that instant. There is an AND circuit 172 for each column used on any of the cards, only a few of which are shown for simplification and clarity of the drawings. Each AND circuit 172 has two input terminals 172a, 172b, one (172a) of which is connected by line 173a to one of the tens output terminals 168 of counter 164 and the other (172b) of which is connected by line 173b to one of the unit outputs 170. A signal (that is, a plus voltage) is transmitted from the counter to one AND circuit 172 at any instant corresponding to the column of the card being read at that instant. AND circuits 172 for columns 1, 2, 3, 4, 5, 7, 32, 33, 34 and 35 only are shown, the columns corresponding to each being indicated in a circle adjacent each of the AND circuits.

A signal is impressed on the "0" output terminal 151 of card reader 150 when reading a card if a hole is punched in row "0" of column 1 of the card to indicate the card is a header card; a signal is impressed on the "1" output terminal 151 of card reader 150 when a card is in the reader if a hole is punched in row 1 of column 1 of the card to indicate the card is an article card. Input terminals 176 and 178 of a flip-flop circuit 184 are connected, respectively, by lines 180, 182 to the output terminals 185a, 186a of AND circuits 185, 186. One input terminal 185b, 186b of each circuit 185, 186 is connected by line 187 to output terminal 208 of AND circuit 172 for column 1. The other input terminals 185c, 186c of AND circuits 185, 186 are connected, respectively, to the "0" and "1" terminals 151 of the card reader 150.

There is located, at each of the packing stations 92a, 92b, 92c, 92d, 92e and 92f a read-out unit 190a, 190b, 190c, 190d, 190e and 190f (FIG. 16), each containing three read-out digit units 192 (FIG. 10) with tubes capable of displaying any of the digits 0 to 9 depending on the signal transmitted to the four input terminals 194. The tube unit 192 converts an 8, 4, 2, 1 input code signal to a corresponding digit and displays that digit. The unit 192 is reset by a positive signal received at the input terminal 195 thereof. The digit unit may, for example, be a Burroughs Corporation NIXIE Tube Driver with tube BIP-8804.

Figure 10:
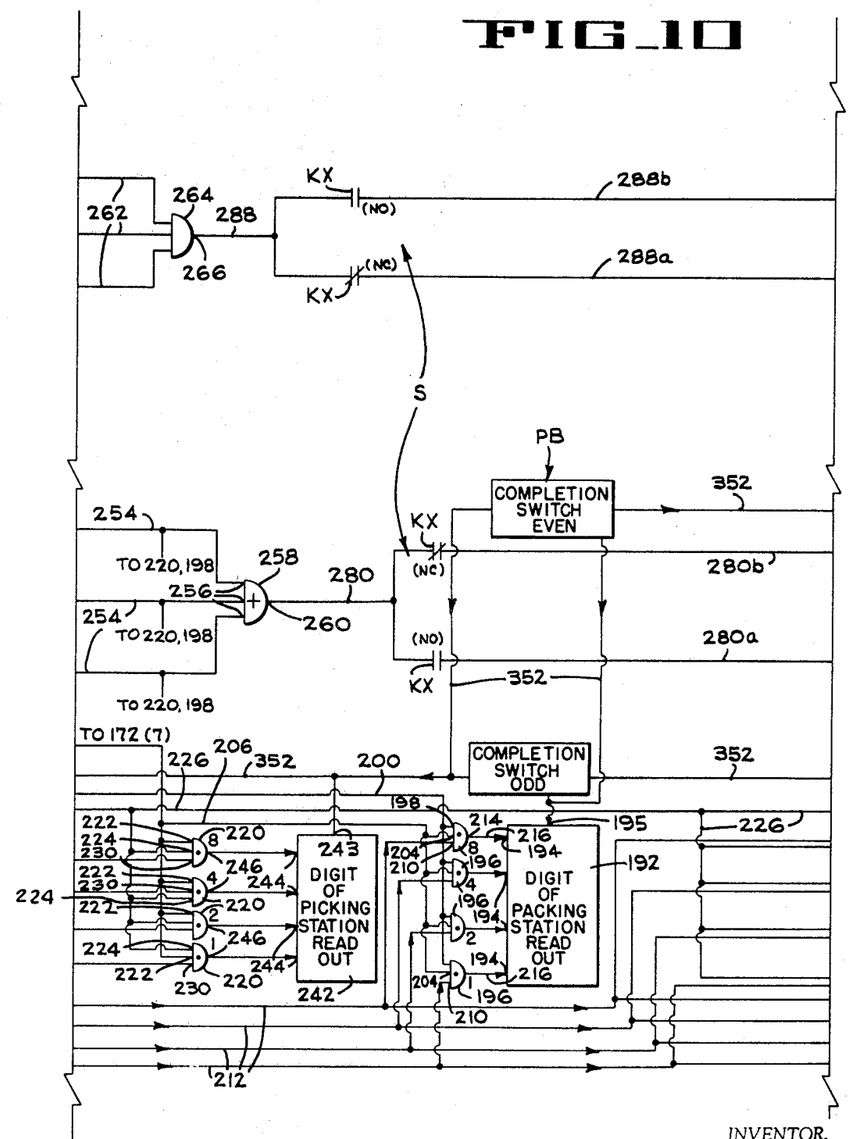

A set of four AND circuits 196 is provided for each digit unit 192, one AND circuit 196 for each input terminal 194 of the digit unit 192. Each AND circuit 196 has an input terminal 198 connected by line 200 to the output terminal 202 of flip-flop circuit 184. A positive voltage will be impressed on input terminal 198 when the card reader is reading a header card.

Figure 16:
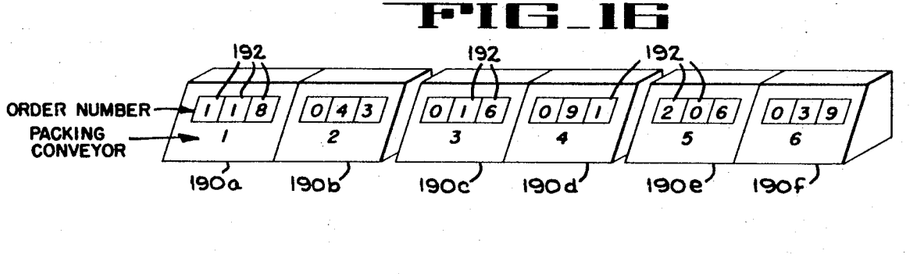

Each AND circuit 196 has another input terminal 204 connected by line 206 to the output terminal 208 of one of the AND circuits 172. Each AND circuit 196 also has an input terminal 210 connected by line 212 to one of the output terminals 160 of the binary coded decimal conversion unit 158. Thus, a particular AND circuit 196 will transmit a signal from the output terminal 214 thereof by line 216 to input terminal 194 of read-out digit unit 192 when a header card is in the reader, the reader is reading the particular card column which controls the particular AND circuit 172, and a positive voltage is being transmitted from the particular output 160 of the binary coded decimal conversion unit to which the particular AND circuit 196 is connected. Thus, when this occurs, a particular digit is transmitted to a particular digit read-out unit 192 corresponding to the digit hole punched in the column of the card currently being read. The header card has six three digit numbers punched therein providing in numerical code the identity of the order (or, more specifically, the store from which the order was received) which is to be received at each of the six packing stations. As the card reader scans the columns consecutively of the header card, the store identifying code numbers are inserted in the read-out units 190 at the packing stations, as shown in FIG. 16.

A read-out unit 232 (FIG. 15) in each picking station has a three digit display 234 indicating required bin number, a two digit display 236 indicating compartment number in the bin for the article, and a three digit display 238 indicating the total quantity of that particular article required. Six two digit displays 240a, 240b, 240c, 240d, 240e and 240f indicate the number of that particular article needed for each customer, or order, of the group of orders.

Each digit display unit 242 (FIG. 10), which is identical to digit unit 192, will indicate one digit and will retain that digit until reset by a signal at reset terminal 243. Each digit unit has four input terminals 244 corresponding, respectively, to digits 8, 4, 2, 1 in the binary decimal code. Each of the input terminals is connected to the output terminal 246 of one of the AND gates 220 in a set of four. There is a set of four AND gates 220 for each digit on read-out unit 232 (only one set of which is shown for simplification and clarity of the circuit). Each AND gate 220 has an input terminal 222 connected to the output terminal 208 of AND gate 172. Each AND gate 220 also has an input terminal 224 connected by line 226 to output terminal 228 of flip-flop circuit 184.

Terminal 228 has a positive voltage impressed thereon whenever a positive voltage is produced at input terminal 178 of flip-flop circuit 184. This occurs when an article card 112 (FIG. 8) in the reader produced a pulse at the "1" output terminal 151 of card reader 150 and a pulse is produced at the output terminal 208 of AND circuit 172 for column 1. These pulses are transmitted to the input terminal of AND circuit 186. A pulse then appears at output terminal 186a of AND circuit 186 which is transmitted by line 182 to input terminal 178 of flip-flop circuit 184. A pulse at input terminal 178 produces a signal at output terminal 228 of flip-flop circuit 184 to indicate that an article card is being read in the reader. Conversely, the presence of a header card 110 (FIG. 7) in the card reader 150 produces a pulse at the "0" terminal which produces a pulse at input terminal 185c of AND circuit 185. This pulse, coupled with a pulse at input terminal 185b from output terminal 208 of AND circuit 172, produces an output pulse at output terminal 185a. A pulse at terminal 185a is transmitted by line 180 to input terminal 176 of flip-flop circuit 184. A pulse at input terminal 176 of flip-flop circuit 184 produces an output signal at output terminal 202 to indicate the presence of a header card in the reader.

A third input terminal 230 of each AND circuit 220 is connected by line 212 to one of the output terminals of binary coded decimal conversion unit 158. Thus, when an article card is in the card reader, and a particular column of that card is being read, the digit indicated by the punched hole in that column will be displayed on a digit read-out unit 242. As the card reader at each picking station scans an article card, all the data on that card, which includes bin number, compartment number, total quantity required, and quantity required for each store of the group, is displayed on the read-out unit 232 at that picking station.

Column 2 of each article card (FIG. 8) has a hole punched in the zero row thereof if the bin number (columns 3, 4 and 5) is odd; no hole is punched in column 2 if the bin number is even. The signal indicating the presence of an odd bin number is transmitted by line 250 (FIG. 9) to input terminal 252 of the AND circuit 172 which is connected (by lines 173a, 173b) to the tens output terminal "0" of counter 166 and to the unit output terminal "2" of the counter 166. Thus, if the bin number is odd, a signal will be transmitted to the output terminal 208 of the "2" AND gate 172 to energize relay KX. The relay KX is sealed in through its own normally open contacts KX and through the normally closed contacts K2. In the drawings normally open contacts are indicated (NO) and normally closed contacts are indicated (NC).

All odd numbered bins are on conveyor 10 and all even numbered bins are on conveyor 12. The three AND circuits 172 corresponding to the card columns 3, 4 and 5 which give the bin number (that is, the three AND circuits 172 connected to the units and tens output terminals of the counter 03, 04, 05) have their output terminals 208 connected by lines 254 to the input terminals 256 of OR gate 258 (FIG. 10). Thus, a signal is impressed on output terminal 260 of OR gate 258 whenever the card reader is scanning either columns 3, 4 or 5 of the article card.

It will be noted (FIG. 8) that the columns 33, 34 and 35 of the article card are provided to indicate the next bin number required on the other conveyor. The cards of each group are preferably arranged so that unless successive articles are required from the same bin, the cards will specify alternately articles from an odd numbered bin and articles from an even numbered bin. Therefore, when this can be accomplished, the bin number in columns 33, 34 and 35 will be even if the bin number in columns 3, 4 and 5 is odd. Similarly, the bin number in columns 33, 34 and 35 will be odd if the bin number in columns 3, 4 and 5 is even. If consecutive articles are both from even numbered bins, because the next article required from an odd numbered bin is too far away on conveyor 10, or are both from odd numbered bins because the next article required from an even numbered bin is too far away on conveyor 12, the entry in columns 33, 34 and 35 is nevertheless for the next required bin on the conveyor other than the conveyor transporting the particular article identified by the card.

The three AND circuits 172 corresponding to columns 33, 34, 35 (FIG. 9) have their output terminals 208 connected by lines 262 to OR circuit 264 (FIG. 10). Thus, a signal is impressed on output terminal 266 of OR gate 264 whenever the card reader is scanning either columns 33, 34 or 35 of the article card.

Figure 11:
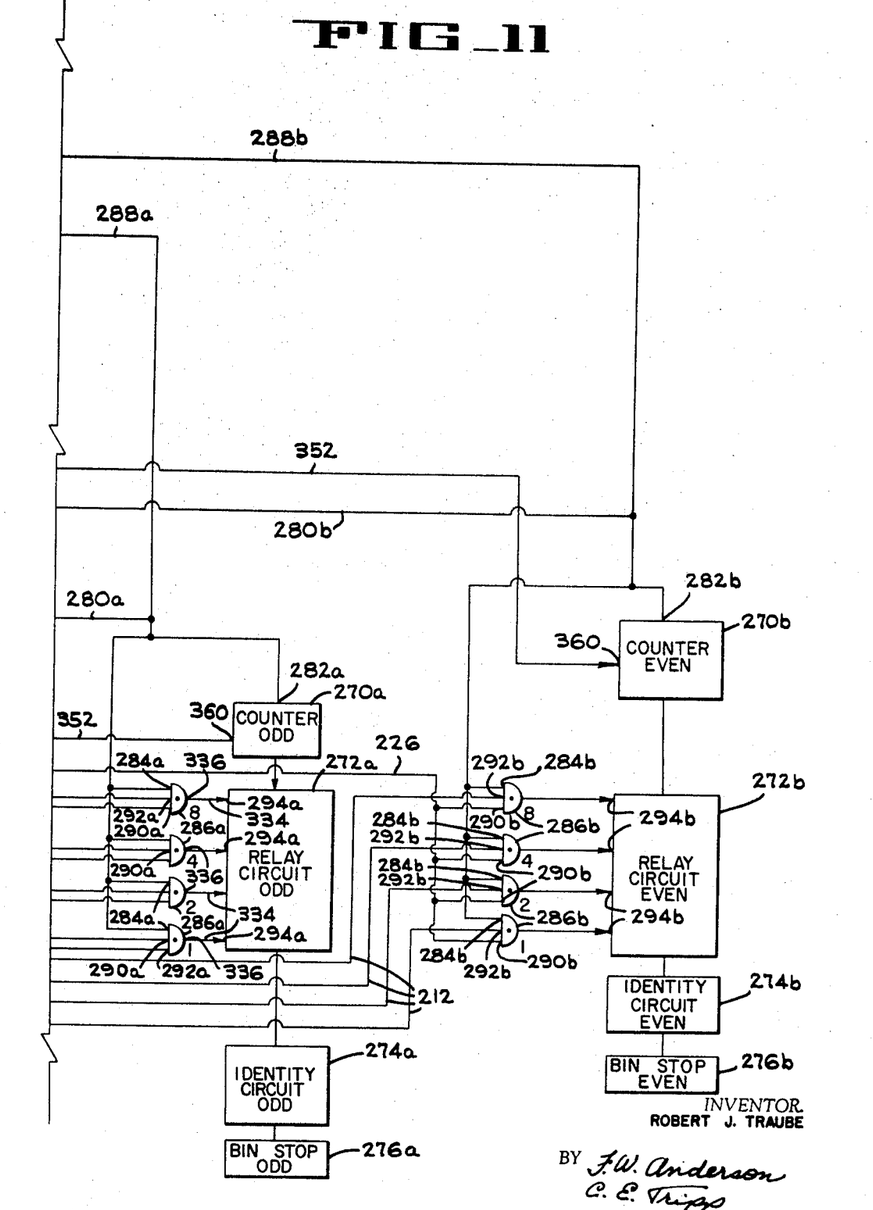

As shown in FIG. 11, there is a counter 270a, a relay circuit 272a, an identity circuit 274a, and a bin stop circuit 276a for conveyor 10. There are similar elements 270b, 272b, 274b and 276b, respectively, for conveyor 12. Because the elements for one conveyor are identical to the corresponding elements of the other conveyor, only one set of the elements will be described.

A switching network, indicated generally at S (FIG. 10), serves to connect the output terminal of one of the OR gates 260 or 266 to one of the sets of circuit elements provided for each conveyor and to connect the output terminal of the other OR gate to the other set of circuit elements for the other conveyor. A line 280 connected to output terminal 260 of OR gate 258 has two branches 280a and 280b. Branch 280a, which contains normally open contacts of relay KX, is connected to the input terminal 282a of counter 270a (FIG. 11), and to the input terminals 284a of four AND gates 286a. Branch 280b, which contains normally closed contacts of relay KX (FIG. 10), is connected to the input terminal 282b of counter 270b (FIG. 11), and to the input terminals 284b of four AND gates 286b, A line 288 (FIG. 10) connected to output terminal 266 of OR gate 264 has two branches 288a and 288b. Branch 288a, which contains normally closed contacts of relay KX, is connected to the input terminal 282a of counter 270a (FIG. 11), and to the input terminals 284a of AND gates 286a. Branch 288b, which contains normally open contacts of relay KX (FIG. 10), is connected to the input terminal 282b of counter 270b (FIG. 11), and to the input terminals 284b of AND gates 286b.

AND gates 286a have input terminals 290a which are connected to line 226 to receive a positive signal when an article card is in the reader. AND gates 286a also each have an input terminal 292a which is connected to one of the lines 212 to receive a digit in 8, 4, 2, 1 code from the binary coded decimal conversion unit 158. If there is an odd number in columns 3, 4 and 5 of the card, indicating the desired part is in an odd numbered bin, relay KX will be energized from the hole punched in column 2 and the normally open KX contacts will be closed. When this occurs, the counter 270a will receive three impulses from branch line 280a, as the reader scans columns 3, 4 and 5, and the relay circuit 272a will receive, at the four input terminals 294a thereof, pulses (or no pulses) from the four AND gates 284a to present, in 8, 4, 2, 1 code, three consecutive digits corresponding to the three consecutive digits in columns 3, 4 and 5 of the article card as they are read successively by the card reader.

AND gates 286b have input terminals 290b which are connected to line 226 to receive a positive signal when an article card is in the reader. AND gates 286b also each have an input terminal 292b which is connected to one of the lines 212 to receive a digit in 8, 4, 2, 1 code from the binary coded decimal conversion unit 158. When there is an odd number in columns 3, 4 and 5 of the card, relay KX is energized and the normally open KX contacts are closed. Thus, since there is an odd number in columns 3, 4 and 5, there will be an even number in columns 33, 34 and 35. The digits in columns 33, 34 and 35 represent the next bin number on the opposite conveyor, and each time the card reader reads one of these digits, an impulse is received by counter 270b through branch line 288b. At the same time, the relay circuit 272b will receive, at the four input terminals 294b thereof, pulses (or no pulses) from the four AND gates 286 b to present, in 8, 4, 2, 1 code, three consecutive digits corresponding to the three consecutive digits in columns 33, 34 and 35 as they are read successively by the card reader.

If an even numbered bin is called for in columns 3, 4 and 5 of the article card, column 2 will have no hole punched and relay KX will not be energized. Thus, normally closed relay contacts KX will be closed and normally open relay contacts KX will be open. Pulses will be transmitted from OR circuit 258 (FIG. 10) through line 280 and branch line 280b to counter 270b and to AND gates 286b (FIG. 11). Thus, the digits read by the card reader in columns 3, 4 and 5 will be transmitted to relay circuit 272b. The next bin number which appears in columns 33, 34 and 35 will be odd. Three consecutive pulses will be transmitted from OR gate 264 (FIG. 10) through line 288 and branch 288a to counter 270a and to AND gates 286a (FIG. 11). Thus, an odd number in columns 3, 4 and 5 or in columns 33, 34 and 35 transmitted to relay circuit 272a to control the conveyor 10 which carries only the odd numbered bins. Similarly, an even number in columns 3, 4 and 5 or in columns 33, 34 and 35 will be transmitted to relay circuit 272b to control the conveyor 12 which carries only the even numbered bins.

Figure 12:
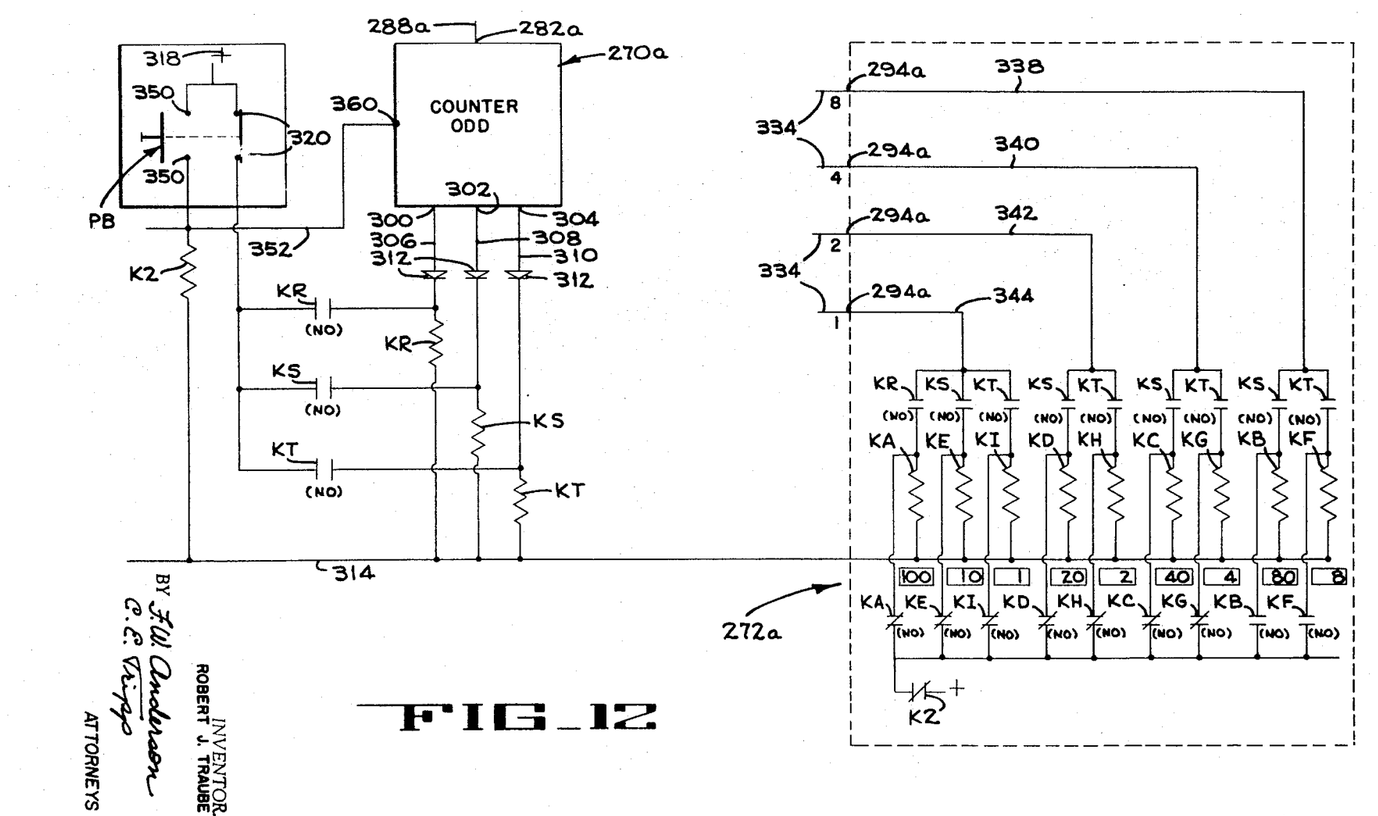

Since the elements 270a, 272a, 274a and 276a for the conveyor 10 of odd numbered bins are identical to the elements 270b, 272b, 274b and 276b for the conveyor 12 of even numbered bins, only the former elements will be described. As shown in FIG. 12, the counter 270a has three output terminals 300, 302 and 304. Lines 306, 308 and 310, each containing diode 312, are connected, respectively, between the output terminals and a source of negative potential (represented by line 314). Line 306 contains relay KR which is energized when the first, or hundreds, digit of the odd bin number (either columns 3 or 33 of the article card) is read by the card reader. Line 308 contains relay KS which is energized when the second, or tens, digit of the odd bin number (either columns 4 or 34 of the article card) is read by the card reader. Line 310 contains relay KT which is energized when the third, or unit, digit of the odd bin number (either column 5 or 35 of the article card) is read by the card reader. Relays KR, KS and KT, when energized, are each sealed in by their own normally open relay contacts KR, KS and KT, which are connected, respectively, between lines 300, 302, 304 and a source 318 of positive voltage through normally closed contacts 320 of push button completion switch PB.

The input terminals 294a of relay circuit 272a are connected by lines 334 to the output terminals 336 of AND gates 286a (FIG. 11). Inside relay circuit 272a, line 338 connects to the terminal 294a which represents 8 in the digit code; line 340 connects to terminal 294a which represents 4 in the digit code; line 342 connects to terminal 294a which represents 2 in the digit code; and line 344 connects to terminal 294a which represents 1 in the digit code. Each of these lines terminate in parallel branches containing normally open contacts of the relays KS, KT (lines 338, 340, 342) and KR, KS and KT (line 344). The contacts KR, KS and KT of line 344 connect to relays KA, KE and KI, respectively. The contacts KS and KT of line 342 connect to relays KD and KH, respectively. The contacts KS, KT of line 340 connect to relays KC, KG, respectively. The contacts KS, KT of line 338 connect to relays KB, KF, respectively. Each of the relays KA, KE, KI, KD, KH, KC, KG, KB and KF, when energized, are sealed in through their own normally open contacts and through normally closed contacts of a relay K2. As indicated in blocks in FIG. 12, relays KA, KE and KI are energized through line 344 and contacts KR, KS, KT to indicate 100, 10 and 1; relays KD and KH are energized through line 342 and contacts KS and KT to indicate 20 and 2; relays KC and KG are energized through line 340 and contacts KS and KT to indicate 40 and 4; and relays KB and KF are energized through line 338 and contacts KS and KT to indicate 80 and 8.

The switch PB has normally open contacts 350 which, when closed, energize relay K2 connected in circuit with the contacts 350. Energization of relay K2 opens the normally closed contacts K2 which are connected in series with each of the sealing contacts KA, KE, KI, KD, KH, KC, KG, KB and KF, in the relay circuit 272a. Thus, when contacts K2 in the relay circuit open, all the relays KA, KE, KI, KD, KH, KC, KG, KB and KF are released. Similarly, the relay KX (FIG. 9), which has sealing contacts connected in series with normally closed contacts of relay K2, is released. When contacts 350 of switch PB close, line 352 is connected to positive voltage source 318. Line 352 terminates at reset terminal 354 of card column counter 166; at reset terminal 358 of card reader 150; at reset terminal 360 of counter 270a (FIG. 10); at reset terminal 195 of digit unit 192 (FIG. 10); and at reset terminal 243 of digit unit 242. As contacts 350 of switch PB close, normally closed contacts 320 open to deenergize relays KR, KS and KT.

When the first digit of a bin number (column 3 or column 33) is received at terminals 294a of relay circuit 272a (FIG. 12) from OR circuit 258 or 264 (FIG. 10), a signal is simultaneously transmitted to counter 270a (FIG. 12) to energize relay KR, and only relay KR. Thus, the contacts KR of relay circuit 272a are closed. It should be noted that since the highest bin number is 199, the line 344 (which corresponds to 1 in the 8, 4, 2, 1 code) is the only line with KR contacts. Thus, only relay KA is energized, if a pulse is received on line 344, and this relay is sealed in through its own contacts. When the next digit of the bin number (column 4 or column 34) is received at terminals 294a, a signal is simultaneously transmitted to counter 270a to energize relays KS, and only relays KS. If the digit requires a pulse on some of the 8, 4, 2, 1 lines 338, 340, 342, 344, the relays KE, KD, KC and KB connected to the lines which receive a pulse, will be energized. When the last digit of a bin number (column 5 or column 35) is received at terminals 294a, a signal is simultaneously transmitted to counter 270a to energize relay KT, and only relay KT. If the digit requires a pulse on some of the lines 338, 340, 342, 344, the relays KI, KH, KG and KF connected to lines which receive a pulse, will be energized. The relays KA, KE, KI, KD, KH, KC, KG, KB, and KF, which, when energized, are sealed in through their own contacts, indicate the bin number transmitted to the relay circuit from the card reader. Thus, for example, if the bin number 177 is transmitted to the relay circuit 272a, relay KA, KE, KI, KD, KH, KC and KG (which represent, respectively, 100, 10, 1, 20, 2, 40, 4, as indicated in FIG. 12) will be energized and will be sealed in through their own contacts. Relays KB and KF (which represent 80 and 8) will not be energized.

Figure 17:
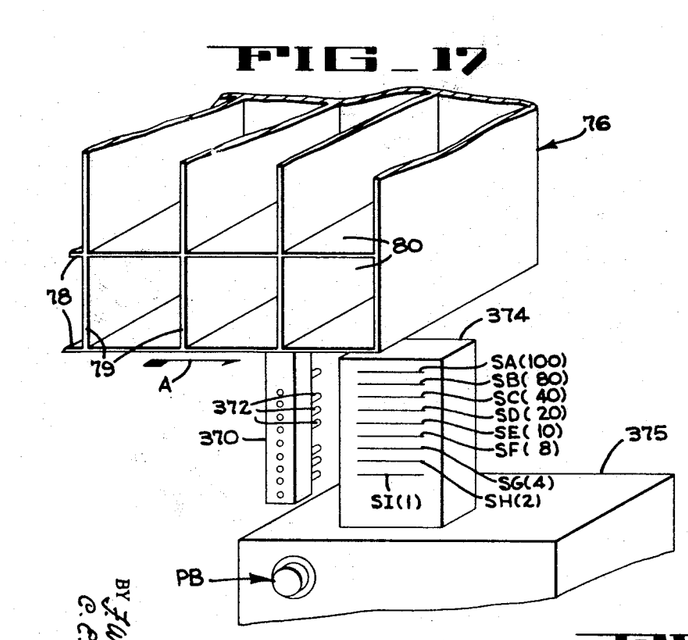
FIG. 17 is a view in perspective of the code identifying indicia on the bin and the code detecting mechanism for a conveyor in a picking station.

Each bin 76 (FIG. 17) has code identifying indicia in the form of a code bar 370 depending therefrom. Each code bar has a series of actuating rods 372 extending therethrough, the quantity and position of the rods determined by the number of the bin. The rods are positioned to operate certain switches of a set of nine switches, SA, SB, SC, SD, SE, SF, SG, SH and SI mounted on a panel 374, one set for each conveyor in each picking station. Each panel of switches, which comprises a code detecting, or reading mechanism for each conveyor in a picking station, is mounted on a pedestal 375 (one for each conveyor) beneath the conveyor for which the panel is provided. Each panel of switches is operated by the code bar of the bins of that conveyor. As indicated in FIG. 17, switch SA corresponds to 100, switch SB corresponds to 80, switch SC corresponds to 40, switch SD corresponds to 20, switch SE corresponds to 10, switch SF corresponds to 8, switch SG corresponds to 4, switch SH corresponds to 2, and switch SI corresponds to 1. The rods 372 are arranged on code bar 370 to operate those switches, and only those switches, which add up to the bin number. Thus, bin number 177 would have rods positioned to operate switches SA, SC, SD, SE, SG, SH and SI. No rods would be provided to operate switches SB and SF.

The identity circuit 274a (FIG. 13) has contacts operated by the bin code switches at each picking station and by the relays in the relay circuit 272a. If the bin which operates the switches at the picking station has the same number as the number placed in the relay circuit 272a by the card reader, a circuit is made (FIG. 13) to connect the solenoid SOL1 (FIG. 14) across a source 380 of positive voltage and a source 382 of negative voltage. The solenoid, when energized, actuates a stop 384 mounted on rail 22 in the picking station above pedestal 375 and a short distance downstream from the code reading panel 374 on the pedestal. The stop 384, when actuated, moves into the path of the group 68 of links which carry the bin, the code number of which is read at the picking station, as shown in FIG. 6. Thus the stop 384 is controlled by the card reader 150 through the network (shown in FIGS. 11, 12 and 13) by which the card reader 150 is connected to the stop 384 of circuits 276a and 276b.

Figure 13:
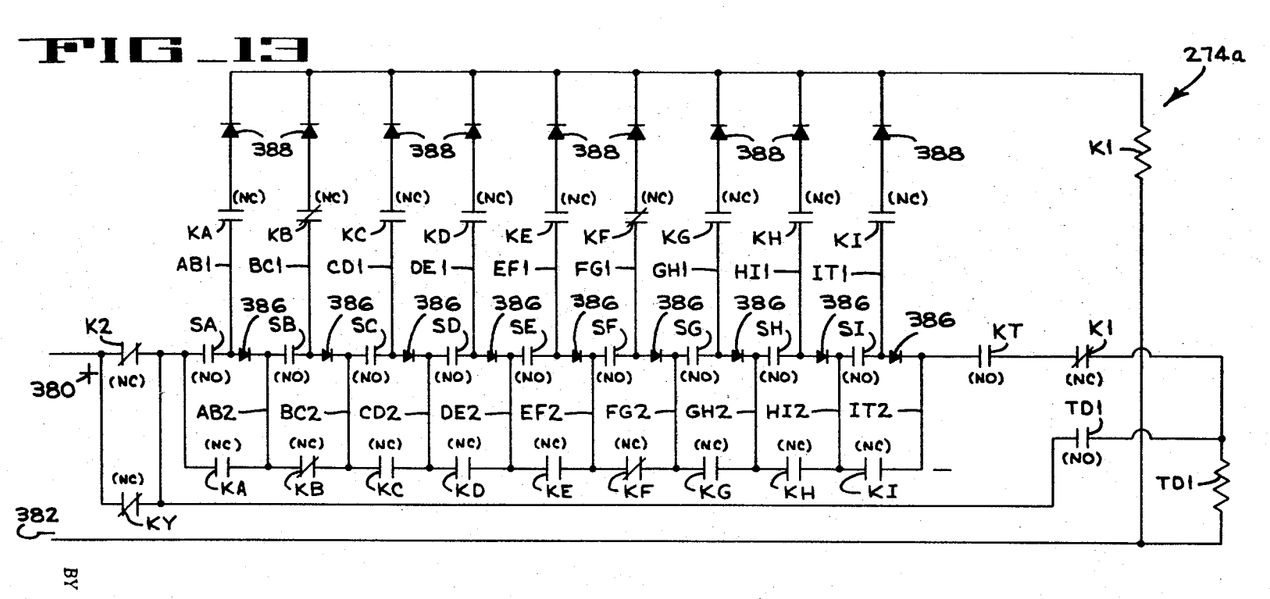
Figure 14:
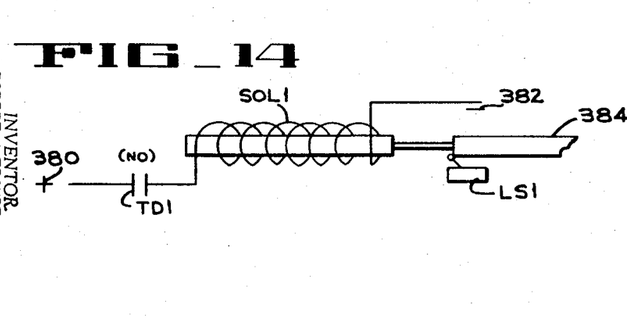
Figure 15:
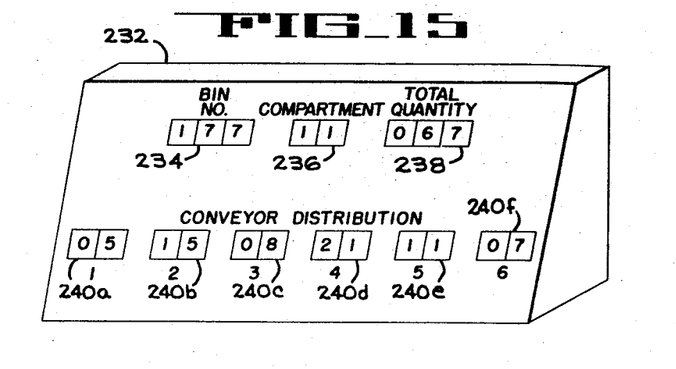
FIGS. 15 and 16 are views of the read-out units for a picking station and six packing stations, respectively, for the system of FIG. 1.

Normally closed switch contact K2, normally open contacts SA, SB, SC, SD, SE, SF, SG, SH, SI, KT, and normally closed switch contact K1 are connected in series with relay TD1 between positive and negative voltage levels 380 and 382. Branch lines AB1 and AB2, separated by a diode 386, are connected between switch contacts SA and SB; branch lines BC1 and BC2, separated by a diode 386, are connected between switch contacts SB and SC; branch lines CD1 and CD2, separated by a diode 386, are connected between switch contacts SC and SD; branch lines DE1 and DE2, separated by a diode 386, are connected between switch contacts SD and SE; branch lines EF1 and EF2, separated by a diode 386, are connected between switch contacts SE and SF; branch lines FG1 and FG2, separated by a diode 386, are connected between switch contacts SF and SG; branch lines GH1 and GH2, separated by a diode 386, are connected between switch contacts SG and SH; branch lines HI1 and HI2, separated by a diode 386, are connected between switch contacts SH and SI; branch lines IT1 and IT2, separated by a diode 386, are connected between contacts SI and KT. Sealing contacts TD1, which closes on energization of relay TD1, are connected around the series arrayed contacts SA, SB, SC, SD, SE, SF, SG, SH, SI, KT and K1.

Normally closed contacts KA are connected in line AB1; normally closed contacts KB are connected in line BC1; normally closed contacts KC are connected in line CD1; normally closed contacts KD are connected in line DE1; normally closed contacts KE are connected in line EF1; normally closed contacts KF are connected in line FG1; normally closed contacts KG are connected in line GH1; normally closed contacts KH are connected in line HI1; normally closed contacts KI are connected in line IT1. Each of the contacts KA, KB, KC, KD, KE, KF, KG, KH, KI are connected through diodes 388, respectively, and relay K1 to the source of negative voltage.

Normally closed switch KA is connected from one side of switch contacts SA to line AB2 on the other side thereof. Normally closed contacts KB are connected between lines AB2 and BC2; normally closed contacts KC are connected between lines BC2 and CD2; normally closed contacts KD are connected between lines CD2 and DE2; normally closed contacts KE are connected between lines DE2 and EF2; normally closed contacts KF are connected between lines EF2 and FG2; normally closed contacts KG are connected between lines FG2 and GH2; normally closed contacts KH are connected between lines GH2 and HI2; normally closed contacts KI are connected between lines HI2 and IT2.

When the code number of the bin at the picking station is the same as the code number imparted by the card reader to relay circuit 272a, the bin stop 384 will be extended to stop the bin in the picking station for picking. For example, if the number sent to the relay circuit 272a by the card reader is 177, relays KA, KE, KI, KD, KH, KC and KG (FIG. 12) will be energized. Also, if bin number 177 approaches the picking station, the rods on the code bar thereof will close switches SA, SC, SD, SE, SG, SH and SI in the picking station. Therefore, in the identity circuit 274a (FIG. 13), normally closed switch contacts KA, KC, KD, KE, KG, KH, and KI will be open, while normally closed contacts KB and KF will be closed. Similarly, the normally open contacts SA, SC, SD, SE, SG, SH and SI will be closed. A circuit will be completed through contacts SA, KB, SC, SD, SE, KF, SG, SH, SI, KT (which is closed when the third, or least significant, digit of a bin number is read by the card reader) and normally closed contacts K1 to energize relay TD1. Energization of relay TD1 closes the normally open contacts TD1 of the relay (FIG. 14) to energize solenoid SOL1 and extend stop 384 into the path of the bin number 177. If the code bar 370 of a different bin than one called for by the card in the card reader closes all the switches which would be closed by the code-bar on the desired bin, plus an additional switch or switches, a circuit will be made through one of the lines AB1, BC1, CD1, DE1, EF1, FG1, GH1, HI1, or IJ1. This is because the switch contacts in that line operated by relays not corresponding to a number called for by the card in the reader (such as contacts KB) are closed. If, therefore, the switch SB (which is a notch which wouldn't be closed by the desired bin) is closed, relay K1 will be energized to open normally closed contacts K1 and disable relay TD1.

Normally closed contacts K2 in relay circuit 274a will open when push button completion switch contacts 350 are closed to energize relay K2. Opening of contacts K2 will release relay TD1, and deenergize SOL1 to retract stop 384, thereby releasing the bin 177, if normally closed contacts KY, which are connected across contacts K2, are open.

If the next article to be picked from an odd numbered conveyor is located in a bin other than bin 177, contacts KY will be open so that bin 177 will be released when contacts K2 open. If, on the other hand, the next article from an odd numbered bin is to be picked from bin 177, the contacts KY will remain closed so that relay TD1 will remain energized despite the opening of contacts K2 when the picking operator pushes the completion button.

The operation of contacts KY is controlled from data on the article card. If the next article in an odd numbered bin is in a bin other than bin 177, a hole is punched in the "0" row of column 32 of the article card. An AND circuit 172 (FIG. 9) is provided for column 32, the circuit having input terminals connected to the "3" terminal of the tens terminals 168 and to the "2" terminals of the unit terminals 170 of card column counter 166. Another terminal of AND circuit 172 is connected to the "0" output terminal 151 of card reader 150. Thus, when the card reader is scanning column 32 and a hole appears in the zero row thereof, the relay KY, which is connected to the output terminal of circuit 172, will be energized. Relay KY is sealed in through its own normally open switch contacts and the parallel connected normally closed contacts K2 and the normally closed limit switch contacts LS1. Limit switch LS1 is mounted in the picking station adjacent the stop 384 and is operated by retraction of the stop.

When the article card 112 indicates the bin is to be released, relay KY is picked up and sealed in, opening the contacts KY in circuit 274a (FIG. 13). When, on completion of picking, the operator pushes completion button PB (which is mounted on pedestal 375) for the conveyor just picked, to close contacts 350 thereof, relay K2 is energized to open all normally closed contacts K2. Relay KY, however, is not released until after the bin stop has been released because the relay KY is sealed in through normally closed contacts of limit switch LS1, which contacts remain closed until after the stop is retracted. Thus, contacts KY in circuit 274a remain open until after the bin is retracted so that relay TD1 is released when relay K2 is energized by the operation of completion button PB.

When card 112 indicates the bin is to be held for the next article to be picked from the odd numbered bins, relay KY is not picked up because there is no hole in column 32 of card 112. Thus, contacts KY of circuit 274a remain closed, and seal in relay TD1 around the contacts K2 in circuit 274a. Thus, despite operation of push button PB by the operator, solenoid SOL1 will remain energized to hold stop 384 extended.

In the operation of the conveyor system of the present invention, each of the picking station operators is given one group of cards which they place simultaneously in their respective card readers 150 and 152. Each pushes the completion button PB for both conveyors to reset all the counters and prepare the system for the first card of the group. The first card of each group is the header card, and, as the card reader scans the columns thereof, the numbers corresponding to the stores, the orders from which make up the particular group of cards in the reader, are read. The store numbers of each group are displayed on the read-out units 192a, 192b, 192c, 192d, 192e and 192f at the packing stations which are supplied by the picking station at which the cards are read.

After the header card has been read, the operators push their respective completion buttons to initiate reading of the first article card at each station. The bin number, compartment number, total number of article required, and quantity of each article required for each order will be displayed on the read-out unit 232 at each picking station. At the same time, the conveyor motors are started to start the bins of both conveyors moving past the picking stations. The odd numbered bin first called for at picking station 14 will be approximately at the opposite end of the conveyor 10 from the odd numbered bin first called for at the picking station 16. Similarly, the even numbered bin first called for at station 14 will be approximately at the opposite end of conveyor 12 from the even numbered bin first called for at station 16. In other words, for each conveyor, the bins at which the operators will pick from simultaneously will be spaced apart on the conveyor a distance equal to the distance between picking stations.

When the first bin called for at each picking station reaches that station, the bin is stopped by plunger 384. Assume, by way of example, that both stations require an odd numbered bin from conveyor 10 (say bin 1 at station 14 and bin 99 at station 16). These bin numbers are placed on columns 3, 4 and 5 of the cards in the card reader, and thus data is supplied to the circuit elements 270a, 272a, 274a and 276a for controlling the conveyor 10 for odd numbered bins. At the same time, the number of the next bin required at each picking station (which is an even numbered bin) appears in columns 33, 34 and 35 of the cards and this data is, at this time, supplied to circuit elements 270b, 272b, 274b and 276b for the conveyor 12 which carries the even numbered bin. The operation of these circuit elements will stop the next bin selected on arrival at the picking station.

Thus, at each station, while the operator is picking particles from one bin (odd numbered), the next bin is moving toward the picking station, and is stopped on arrival at the picking station, so the operator, without delay, can switch his activities from one conveyor to the other. Thus the operator not only need not travel from one bin location to the next in picking articles, but also he need not wait for the next required bin to travel to him with the next article, since, with the use of two coordinated conveyors, bin travel on one conveyor occurs while the operator is picking from a bin on the other conveyor.

It will be noted that with releasable power drivers, each bin on each conveyor can be stopped, or allowed to move, without regard to movement of bins at other parts of the conveyor except that the bins of each conveyor must remain in the same sequence on the conveyor. Provision of unoccupied space on each conveyor 10 and 12 gives elasticity to the system so bins of each conveyor between the respective picking stations need not be precisely coordinated. In other words, a fixed or predetermined number of bins need not be present between the picking stations.

As each picker picks the articles from a bin, the articles are distributed by the picker, in accordance with the instructions on the read-out unit, to the packing conveyors which carry the distributed articles to the packing stations. Alternatively, the articles may be placed in tote-boxes by the picker, one tote-box for each store. The tote-boxes are then transported by any suitable means to a packing station or stations. There may be a packer for each station, or a packer for several stations, but, in either event, the packer is supplied with an invoice for each order to be packed. As the articles are received, they are checked off, and when the order is complete, the order is packed and transmitted to a shipping zone.

As each picker finishes picking a particular article, the completion button PB for the conveyor on which the bin is mounted is pushed to release the bin and, at the same time, to ring the next card into the card reader. The next article card may indicate a requirement for an article in another compartment of the same bin, or for an article in another bin on the other conveyor.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, I claim:

1. A storage system comprising at least two power operated storage conveyors having bins to store goods, said conveyors defining separate endless paths past a common picking station, and control apparatus to receive coded input data and to effect coordinated operation of said conveyors in response to said data to halt selected bins at said picking station, said control apparatus including a stop member for each conveyor, a reader, and bin identifying mechanism, said control apparatus having a control network connected between said reader and said stop members, said stop members operable in response to said reader and bin identifying mechanism to halt a selected bin of a selected conveyor at said picking station.

2. A storage system comprising at least two power operated storage conveyors having bins to store goods, said conveyors defining separate endless paths past a common picking station, and control apparatus to receive coded input data and to regulate the operation of said conveyors in response to said data to halt selected bins at said picking station, said control apparatus having a stop member and including a reader, said control apparatus having a control network connected between said reader and said stop member, said stop member operable to halt a selected bin of a selected conveyor at said picking station, said control apparatus including a read-out unit to indicate to the operator the selected bin in which goods to be picked are stored and to indicate to the operator the quantity of said goods to be picked.

3. A storage system comprising two power operated live storage conveyors to store goods received thereon, said conveyors movable past the same picking station to transport the stored goods on each thereto, and control apparatus to receive input data on goods required to be picked at the picking station and to regulate the operation of both conveyors in response to said data, said control apparatus responsive to input data to produce signals for picking articles from one conveyor in the picking station and to produce signals to condition the other conveyor to stop at the picking station when predetermined desired goods thereon reach the picking station.

4. A storage system comprising at least two power operated storage conveyors having bins to store goods, said conveyors defining separate endless paths past a common picking station, and control apparatus to receive coded input data and to effect coordinated operation of said conveyors in response to said data to halt selected bins at said picking station, said control apparatus responsive to input data substantially simultaneously to produce instructions for picking articles from a bin on one conveyor when said bin is in the picking station and to condition the other conveyor to stop a selected bin in the picking station.

5. The mechanism of claim 4 in which said control apparatus produces instructions for distribution of the articles picked.

* * * * *